US012718254B2

(12) United States Patent
Arrington

(10) Patent No.: US 12,718,254 B2
(45) Date of Patent: Aug. 25, 2026

(54) CARBON FOOTPRINT IDENTIFICATION SYSTEM

(71) Applicant: Toshiba Global Commerce Solutions, Inc., Durham, NC (US)

(72) Inventor: Stacy Arrington, Morrisville, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 217 days.

(21) Appl. No.: 18/112,670

(22) Filed: Feb. 22, 2023

(65) Prior Publication Data

US 2024/0281825 A1 Aug. 22, 2024

(51) Int. Cl.

| | |
|---|---|
| ***G06Q 10/10*** | (2023.01) |
| ***G06Q 10/06*** | (2023.01) |
| ***G06Q 20/20*** | (2012.01) |
| ***G06Q 20/38*** | (2012.01) |
| ***G06Q 30/018*** | (2023.01) |
| ***G06Q 30/02*** | (2023.01) |
| ***G06Q 30/06*** | (2023.01) |

(52) U.S. Cl.

CPC ......... *G06Q 30/018* (2013.01); *G06Q 20/202* (2013.01); *G06Q 20/3829* (2013.01); *G06Q 2220/00* (2013.01)

(58) Field of Classification Search

CPC ............... G06Q 30/018; G06Q 20/202; G06Q 20/3829; G06Q 2220/00; G06Q 10/30; G06Q 20/208; G06Q 20/209; G06Q 30/01; G06Q 30/015; G06Q 30/0207; G06Q 30/0238; G06Q 30/0281; G07G 1/0036; G07G 1/0054; G07G 1/01

USPC ........ 705/1.1–912, 302, 303, 304, 308, 317, 705/346

See application file for complete search history.

(56) References Cited

U.S. PATENT DOCUMENTS 7,813,970 B1 * 10/2010 Brandwine ........ G06Q 30/0633 705/26.1

8,564,621 B2 10/2013 Branson (Continued)

OTHER PUBLICATIONS

D. Mohl, NFTs Explained Quick: From Zero to Hero, Apr. 18, 2022, Mercari Engineering (available at https://engineering.mercari.com/en/blog/entry/20220414-nfts-explained-quick-from-zero-to-hero/).

(Continued)

*Primary Examiner* — Jonathan P Ouellette

(74) *Attorney, Agent, or Firm* — Kaufman & Canoles, P.C.

(57) ABSTRACT

Systems and methods of obtaining carbon footprint information of items checked out by a POS device are presented. In one exemplary embodiment, a method is performed by a POS device having a sensing device operable to sense an identifier specific to a container configured to transport items after checkout. The POS device is coupled to a blockchain network that includes network nodes that are collectively configured to operate a blockchain. The container identifier is specific to a cryptographic digital asset stored on the blockchain as a container identifier code. Further, the cryptographic digital asset includes a reference to carbon footprint information associated with checked out items by the POS device that utilized the container. The method includes sending a blockchain data request associated with the cryptographic digital asset based on the container identifier so that the carbon footprint information associated with the checked out items can be obtained.

21 Claims, 13 Drawing Sheets

(56) References Cited

U.S. PATENT DOCUMENTS 10,769,700 B2 9/2020 Hamilton
11,004,101 B2 5/2021 Balfour
11,403,630 B2 8/2022 Dua
12,373,859 B2 * 7/2025 Duan-Porter ........ G07G 1/0036
2011/0145706 A1 6/2011 Wilson
2014/0274313 A1 9/2014 Bala
2018/0158127 A1 * 6/2018 Hamilton, II .......... G06Q 90/00
2019/0108516 A1 * 4/2019 Jawaharlal ............ H04L 9/3239
2019/0279204 A1 9/2019 Norton
2020/0134656 A1 4/2020 Padmanabhan
2021/0004858 A1 1/2021 Arora
2021/0151202 A1 * 5/2021 Jabbar .................... G16Y 40/10
2021/0224819 A1 * 7/2021 Silverstein ............ G06Q 50/04
2021/0256070 A1 8/2021 Tran
2021/0383461 A1 12/2021 Andon
2022/0114562 A1 * 4/2022 Oliver Gomila ...... G06Q 10/30
2022/0173893 A1 6/2022 Basu
2022/0188839 A1 6/2022 Andon
2022/0207119 A1 6/2022 Andon
2023/0089850 A1 * 3/2023 Zhu ......................... G06F 16/22 705/7.29
2023/0230065 A1 * 7/2023 Yan ........................ G06Q 20/36 705/41
2023/0289715 A1 * 9/2023 Schnitzer ............... G06Q 10/30
2024/0119512 A1 * 4/2024 Musiani ................. G06V 20/52

OTHER PUBLICATIONS

H. Christian, Blockchain Technology Can End a Multimillion Dollar Financial Fraud, Mar. 28, 2022, TotalRetail (available at https://www.mytotalretail.com/article/blockchain-technology-can-end-a-multimillion-dollar-financial-fraud/).

J. Mehta, D. Mehta, J. Jain and S. Dholay, “Asset Tracking System Using Blockchain,” 2021 Asian Conference on Innovation in Technology (Asiancon), Pune, India, 2021, pp. 1-7, doi: 10.1109/ASIANCON51346.2021.9544543.

* cited by examiner

NETWORK NODE 300b

PROCESSING CIRCUITRY 301b

MEMORY 303b

COMMS CIRCUITRY 305b

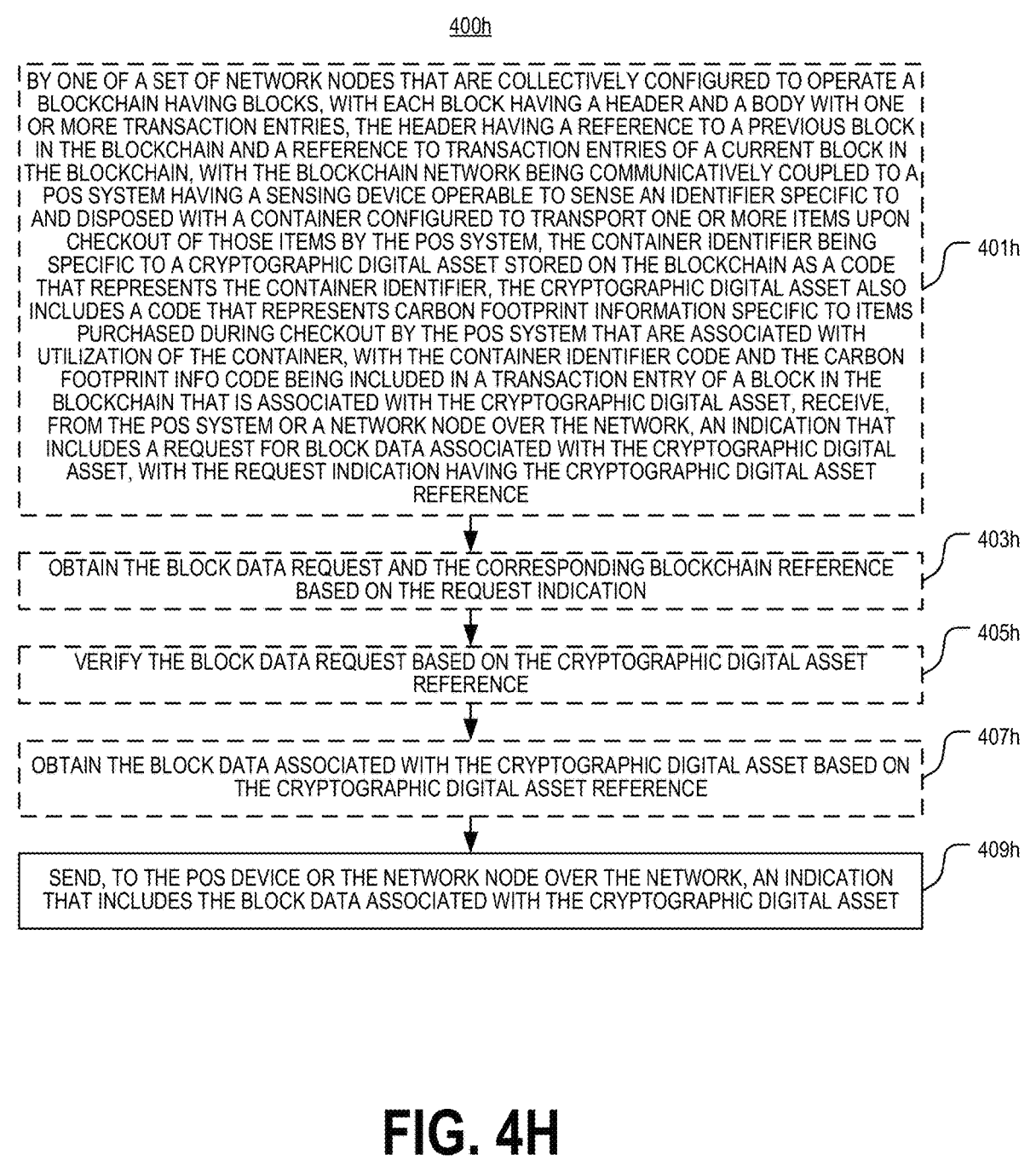

400h

BY ONE OF A SET OF NETWORK NODES THAT ARE COLLECTIVELY CONFIGURED TO OPERATE A BLOCKCHAIN HAVING BLOCKS, WITH EACH BLOCK HAVING A HEADER AND A BODY WITH ONE OR MORE TRANSACTION ENTRIES, THE HEADER HAVING A REFERENCE TO A PREVIOUS BLOCK IN THE BLOCKCHAIN AND A REFERENCE TO TRANSACTION ENTRIES OF A CURRENT BLOCK IN THE BLOCKCHAIN, WITH THE BLOCKCHAIN NETWORK BEING COMMUNICATIVELY COUPLED TO A POS SYSTEM HAVING A SENSING DEVICE OPERABLE TO SENSE AN IDENTIFIER SPECIFIC TO AND DISPOSED WITH A CONTAINER CONFIGURED TO TRANSPORT ONE OR MORE ITEMS UPON CHECKOUT OF THOSE ITEMS BY THE POS SYSTEM, THE CONTAINER IDENTIFIER BEING SPECIFIC TO A CRYPTOGRAPHIC DIGITAL ASSET STORED ON THE BLOCKCHAIN AS A CODE THAT REPRESENTS THE CONTAINER IDENTIFIER, THE CRYPTOGRAPHIC DIGITAL ASSET ALSO INCLUDES A CODE THAT REPRESENTS CARBON FOOTPRINT INFORMATION SPECIFIC TO ITEMS PURCHASED DURING CHECKOUT BY THE POS SYSTEM THAT ARE ASSOCIATED WITH UTILIZATION OF THE CONTAINER, WITH THE CONTAINER IDENTIFIER CODE AND THE CARBON FOOTPRINT INFO CODE BEING INCLUDED IN A TRANSACTION ENTRY OF A BLOCK IN THE BLOCKCHAIN THAT IS ASSOCIATED WITH THE CRYPTOGRAPHIC DIGITAL ASSET, RECEIVE, FROM THE POS SYSTEM OR A NETWORK NODE OVER THE NETWORK, AN INDICATION THAT INCLUDES A REQUEST FOR BLOCK DATA ASSOCIATED WITH THE CRYPTOGRAPHIC DIGITAL ASSET, WITH THE REQUEST INDICATION HAVING THE CRYPTOGRAPHIC DIGITAL ASSET REFERENCE — 401h

OBTAIN THE BLOCK DATA REQUEST AND THE CORRESPONDING BLOCKCHAIN REFERENCE BASED ON THE REQUEST INDICATION — 403h

VERIFY THE BLOCK DATA REQUEST BASED ON THE CRYPTOGRAPHIC DIGITAL ASSET REFERENCE — 405h

OBTAIN THE BLOCK DATA ASSOCIATED WITH THE CRYPTOGRAPHIC DIGITAL ASSET BASED ON THE CRYPTOGRAPHIC DIGITAL ASSET REFERENCE — 407h

SEND, TO THE POS DEVICE OR THE NETWORK NODE OVER THE NETWORK, AN INDICATION THAT INCLUDES THE BLOCK DATA ASSOCIATED WITH THE CRYPTOGRAPHIC DIGITAL ASSET — 409h

FIG. 4H

CARBON FOOTPRINT IDENTIFICATION SYSTEM

BACKGROUND

Retailers use point of sale (POS) devices to streamline checkout operations and to allow retailers to process sales, handle payments, and store transactions for later retrieval. POS devices generally comprise a number of components including POS terminals and bagging stations. In a typical retail environment, there are multiple POS terminals in communication with a server over a network. POS devices typically enable consumers to scan retail items, determine and indicate the amount owed for those items, prepare and present invoices, allow consumers to make payments to retailers for those items, and enable consumers or retail staff to bag those items. The bagging stations typically enable consumers or retail staff to bag purchased retail items in shopping bags during checkout at the POS devices. The shopping bags are typically single-use plastic bags made from various kinds of plastic, with many of these bags being improperly discarded and ending up as harmful plastic waste in the environment. Regardless, product packaging is typically composed of recyclable materials such as paper, metal, glass, plastic, and the like. However, consumers are typically unaware of how much waste is associated with their shopping and uninformed as to local recycling requirements and guidelines.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIGS. 4A-H illustrate embodiments of a method of obtaining carbon footprint information of items checked out by a POS device in accordance with various aspects as described herein.

DETAILED DESCRIPTION

Figure 1A:
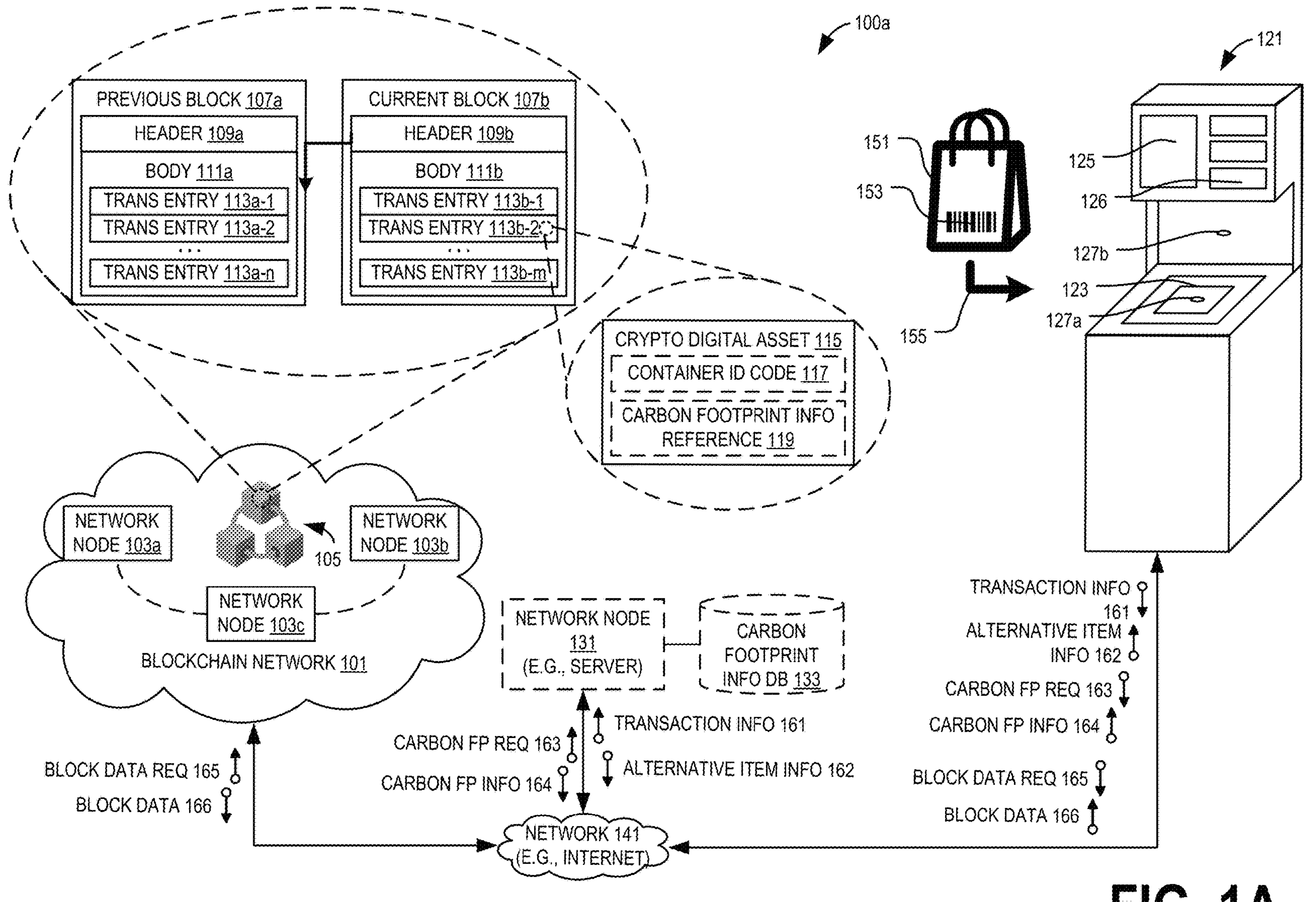
FIGS. 1A-B illustrate embodiments of a system of obtaining carbon footprint information items checked out by a POS device in accordance with various aspects as described herein.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

Consumers are typically unaware of how much waste is associated with their shopping. Further, recycling guidelines can vary across cities and townships, causing confusion for consumers. Such confusion may result in consumers disposing of most if not all waste in trash cans, causing more waste than necessary to be disposed in landfills. Alternatively, consumers may dispose of most if not all waste in the recycling stream, causing more waste than necessary to enter the recycling stream. While manufactures may have tools available to estimate the carbon footprint of items such as for lifecycle analysis, consumers are left unaware of the carbon footprint impact associated with their shopping activities. Accordingly, there is a need for improved techniques to provide consumers with carbon footprint information associated with their shopping activities so that consumers can become more educated and aware of their carbon footprint impact. Carbon footprint information can include waste recycling information, waste disposal instructions, incentives to reduce carbon footprint impact, and more eco-friendly alternatives to purchased items (e.g., products). In addition, other desirable features and characteristics of the present disclosure will become apparent from the subsequent detailed description and embodiments, taken in conjunction with the accompanying figures and the foregoing technical field and background.

This disclosure further includes systems and methods of obtaining carbon footprint information of items checked out by a POS device. In one embodiment, three categories of carbon footprint information are obtained for each purchased item by a consumer, which can be stored such as in a database accessible by a network node or a POS device. A first carbon footprint information category includes packaging information for items available from a retailer. The product packaging information can include information specific to the product packaging such as the materials that compose the product packaging and whether those materials are mixed, the weight, volume or dimensions of the product packaging, or the like. Recyclable materials can include paper, metal, glass, plastic, or the like. Paper commonly results in more than half of the recycled waste. Paper can include cardboard boxes, cereal boxes, newspapers, or the like. Further, paper can be recycled into new products multiple times. Paper that comes into contact with food, such as paper towels or tissues, may not be recyclable. Metal materials such as aluminum, steel, or tin cans are commonly accepted in recycling programs. Plastic and Glass bottles, jars and jugs are widely recycled.

Furthermore, a second carbon footprint category includes transaction information associated with the checkout of one more items by a POS device so that a carbon footprint associated with those items can be obtained and tracked (e.g., weekly, monthly, annually) for that consumer. Such transaction information can include product information, the quantity of each item purchased, the frequency in which each item is purchased, or the like. A third carbon footprint information category includes recycling information for items available from a retailer. Further, the recycling information can include information associated with local trash and recycling collection. Such local trash and recycling collection information can identify which items can be recycled, which items require further processing prior to recycling (e.g., rinsed, emptied, cleaned), which items require separating materials that compose the item, or the like. These three carbon footprint categories can be used to create a carbon footprint profile for one or more items purchased by a consumer. For example, each carbon footprint profile of an item can identify the packaging that can be recycled or discarded, provide processing instructions for that item (e.g., separation, rinsing, cleaning), and the effort that may be required (e.g., estimated effort) to perform such processing instructions. By knowing this information, at checkout, the POS device can display one or more alternative items having a lower carbon footprint packaging than the corresponding scanned item.

During a current checkout, the POS device can display carbon footprint information associated with items scanned by the POS device during the current checkout, a previous checkout, or both. In one example, a retail consumer purchases, during checkout by a POS device, a carton of juice having a packaging weight of 0.25 pounds, but only 0.2 pounds of packaging can be recycled. The consumer's local recycling facilities require all food containers to be rinsed and the corresponding caps to be discarded. This packaging and recycling information is obtained and then provided to the consumer such as by outputting this information to a display of the POS device, sending a text message or an email to the consumer, or the like. Further, the displayed or sent information can include processing-related information such as an estimate of the amount of water required to rinse the carton. In another example, a consumer purchases a container of laundry detergent during checkout by a POS device. The detergent packaging weighs 0.3 pounds. Further, the detergent packaging can be recycled but should be rinsed first. A POS device or a server communicatively coupled to the POS device determines that an alternative item (e.g., dissolvable laundry sheets) to the laundry detergent is available and has a lower carbon footprint. The POS device then outputs for display or the server sends an email or text message recommending this alternative product.

A blockchain is an immutable public or private digital ledger, once a transaction is recorded it cannot be modified. Further, a blockchain can enable a reusable container having a container identifier to be linked to carbon footprint information associated with the checkout of one or more items by a POS device that utilize that container. By linking a reusable container recorded on the blockchain to associated carbon footprint information, the carbon footprint information associated with that reusable container can be obtained and tracked. By doing so, any individual or entity can obtain access to this carbon footprint information to incentivize the user of the reusable container such as to recognize a reduced carbon footprint impact or to provide a discount towards one or more items.

Figure 1B:
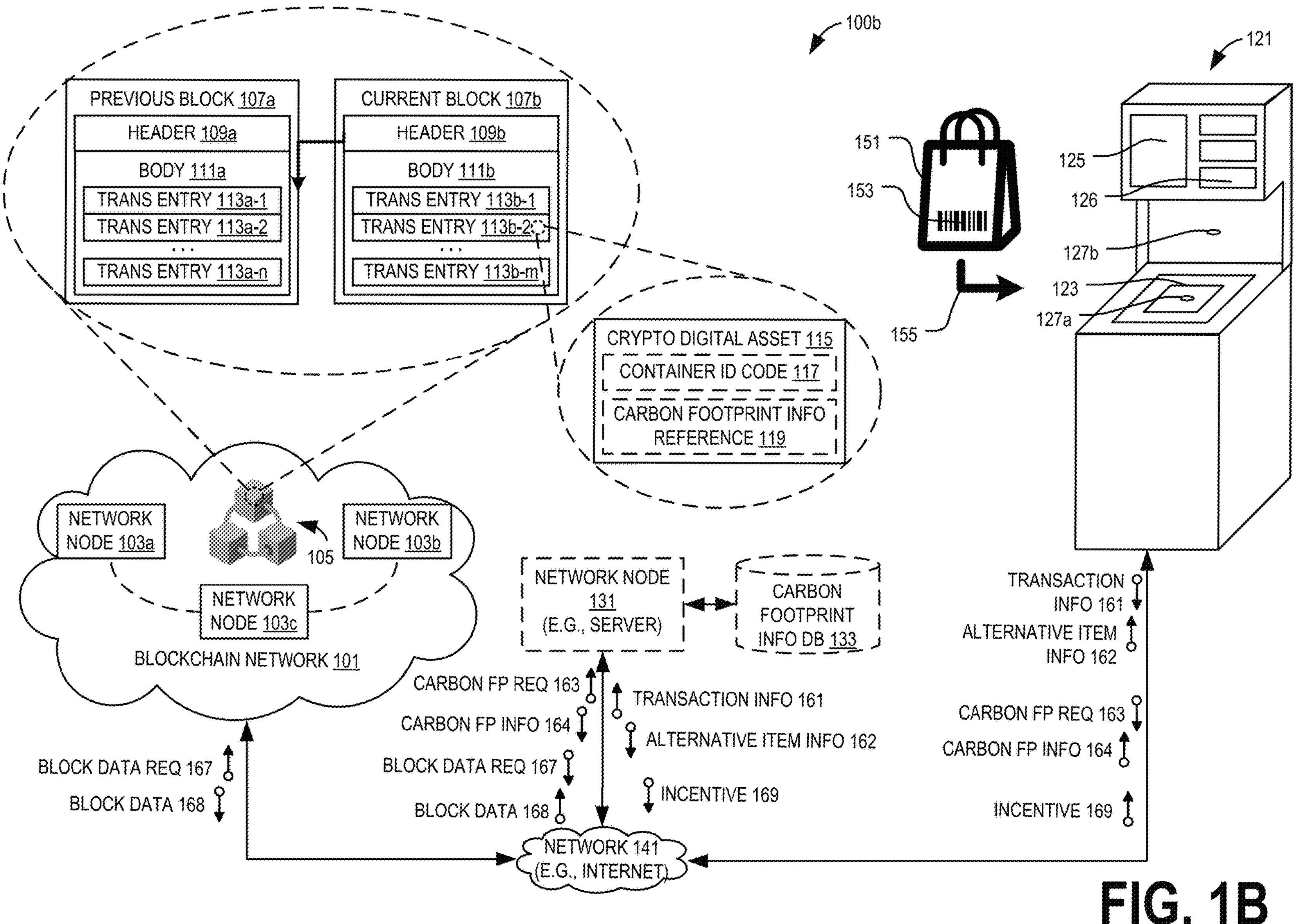

Furthermore, the exemplary embodiments described herein include improved techniques to track carbon footprint information of items checked out by a POS device. For example, FIGS. 1A-B illustrate embodiments of a system 100*a-b* of obtaining carbon footprint information of items checked out by a POS device in accordance with various aspect as described herein. In FIGS. 1A-B, the system 100*a-b* includes a POS system or device 121 (e.g., self-checkout device, assisted checkout device, self-service checkout device, checkout device) coupled to a blockchain network 101 and a network node 131 (e.g., server, smartphone) over a network 141 (e.g., Internet, intranet). The POS device 121 can include one or more sensing devices 127*a-b* (e.g., camera, QR or bar code scanner, RFID device, NFC device), a weight scale 123, the like, or any combination thereof. The POS device 121 can also include a user interface device 125, 126 (e.g., touchscreen display, LED, keypad, payment reader, printer, credit card reader), or the like. The weight scale 123 is operable to measure a weight of an item (e.g., produce) placed on the surface of the scale 123. The weight scale 123 can include an integrated sensing device 127*a* (e.g., scanner scale) that is operable to scan a quick response (QR) code or bar code positioned on an item that is moved over the window surface of the scale 123. The sensing device 127*a,b* can include an RFID detector device that is operable to detect an RFID tag disposed with an item. Further, the sensing device 127*a,b* can include a near field communication (NFC) device that is operable to communicate with an NFC device disposed with an item. Further, the POS device 121 can be operable to obtain a value of a sensed container identifier 153 (e.g., QR code, barcode, RFID, NFC device) disposed with a container 151 and captured by the sensing device 127*a,b* while the container 151 is moved about the POS device 121 or over the window surface of the scale 123, as represented by reference 155.

In FIG. 1, the blockchain network 101 can be a network having a set of network nodes 103*a-c* (e.g., servers) that are configured to store and manage a blockchain 105, including the generation, verification, and addition of new blocks to the blockchain 105. The blockchain 105 can include a set of blocks 107*a-b*, with each block 107*a-b* having a block header 109*a-b* and a body 111*a-b* having a set of transaction entries 113*a*-1-*n*, 113*b*-1-*m*. The block header 109*b* of a current block 107*b* can include a reference to a previous block 107*a*, a timestamp that represents a time when the current block 107*b* was generated, a reference to the set of transaction entries 113*b*-1 to 113*b-m* included in the current block 107*b*, the like, or any combination thereof. Every block 107*a-b* on the blockchain 105 can be verified by determining the reference values using the associated hashing function. The references included on the blockchain 105 can be hash values generated by applying one or more hashing algorithms to the corresponding data. In one example, the reference to the previous block 107*a* can be a hash value generated by applying a hashing algorithm to the block header 109*a* of the previous block 107*a*. The use of the references reflects the immutability of the blockchain 105, as a change to any transaction entry 113*a*-1-*n*, 113*b*-1-*m* on the blockchain 105 would result in a different reference value, which would result in the block header 109*a-b* of the corresponding block 107*a-b* to be changed, which in turn would result in a difference reference value for that block header 109*a-b*, requiring the block headers of all previous blocks to change. The set of transaction entries 113*a*-1-*n*, 113*b*-1-*m* can be represented by a hash tree. For example, the set of transaction entries 113*a*-1-*n*, 113*b*-1-*m* can be represented by a Merkle tree. A Merkle tree is a hash-based tree structure with each leaf node being a hash of a block 107*a-b*, and each non-leaf node being a hash of the children of each block 107*a-b*. Merkle trees can have a branching factor of two with each node having up to two children.

Each transaction entry 113*a*-1-*n*, 113*b*-1-*m* may represent a cryptographic digital asset 115 of a certain container 151 that includes a code 117 associated with the container identifier 153. Further, each cryptographic digital asset 115 can include a reference 119 (coded or uncoded) to carbon footprint information associated with checked out items by the POS device 121 that utilized the container 151. The carbon footprint information can include product packaging information (e.g., weight, volume, dimensions, composition mix), transaction information (e.g., item identifier, item description, item cost, item discount, number of items purchased, date purchased, POS identifier, store identifier, item weight, item volume), recycling information (e.g., items available for recycling, recycling processing requirements, recycling locations), or the like for one or more purchased items by the POS device 121 that utilized the container 151. In one example, a carbon footprint profile can be generated and tracked for one or more items checked out by the POS device 121 that utilized the container 151. Further, each carbon footprint profile can include the carbon footprint information of the corresponding item such as the product packaging information, transaction information, and the recycling information.

The blockchain 105 can include security methods such as the use of public key cryptography, which may also be referred to as asymmetric key cryptography or encryption. Public key cryptography uses pairs of mathematically-related keys (e.g., one public key and one private key) to authenticate data. The private key can be kept secret and can be used to decrypt data. The public key can be shared and can be used to authenticate or encrypt the data. Further, a private key is like a password that enables access to the corresponding cryptographic digital asset or the means to otherwise interact with the various capabilities that the blockchain 105 can support. In one example, the container identifier code 117 can include a cryptographic token and a public or private key. In another example, the cryptographic digital asset 115 can be transferred to a digital wallet of another user with the container identifier code 117 being sent to a blockchain node 103*a-c* of the blockchain 105 and recorded on a new block to confirm the transfer of that cryptographic digital asset 115. Each transfer of a cryptographic digital asset 115 to a digital wallet of a user may include sending an electronic message (e.g., email, text message) to the user with a unique key and a hashed address to the cryptographic digital asset 115. A skilled artisan will readily recognize that any type of information can be stored in a transaction entry of a block and that data so stored may be stored in publicly readable form or in encrypted form depending on the use in which that particular blockchain is intended. While in one embodiment, the container identifier or the carbon footprint information reference may be encrypted, in another embodiment, the container identifier or the carbon footprint information reference may be provided in publicly available form depending on the use in which the blockchain is intended.

In the current embodiment, the POS device 121 can output, for display on the user interface device 125, 126 (e.g., touch screen display), a visual representation associated with a selection to utilize the container 151 for checkout of one or more items by the POS device 121. In response, the POS device 121 can receive, from the user interface device 125, 126, an indication of a touch gesture detected at or about the visual representation associated with the selection to utilize the container 151. Further, the POS device 121 can output, for display on the presence sensitive display 125, 126, a visual representation associated with a request to position the container 151 on or about the surface of the weight scale 123 so that the container identifier 153 can be sensed from the container 151 and can then receive, from the sensing device 127*a-b*, an indication of the sensed container identifier disposed with the container 151. In response, the container 151 can be positioned on or about the surface of the weight scale 123, as represented by reference 155, so that the POS device 121 can receive, from the sensing device 127*a-b*, a sensed container identifier disposed with the container 151. The POS device 121 can determine the container identifier value based on the sensed container identifier. In one example, the container identifier 153 is a QR code or a barcode displayed on an outer surface of the container and the sensing device 127*a-b* (e.g., optical scanner, bar code scanner, camera) is operable to capture the QR code or the barcode displayed on the container 151. In another example, the container identifier 153 is a passive or active RFID tag disposed with the container and the sensing device 127*a-b* is an RFID detector device operable to sense the RFID device. In yet another example, the container identifier 153 is associated with an NFC device and the sensing device 127*a-b* is an NFC device that is operable to communicate with the container identifier NFC device.

Furthermore, the POS device 121 can obtain a blockchain reference to the cryptographic digital asset 115 stored on the blockchain 105 based on the container identifier value. In one example, the container identifier value includes the blockchain reference. In another example, the container identifier value is linked to the blockchain reference such as through a database or user account. The POS device 121 can send, to a network node 103*a-c* of the blockchain network 101 over the network 141, an indication 165 that includes a request for block data associated with the cryptographic digital asset based on the container identifier 153 sensed from the container 151 during checkout of items by the POS device 121, with the request indication 165 including the cryptographic digital asset reference. The blockchain network node 103*a-c* can receive the request indication 165 and in response, the blockchain network node 103*a-c* can obtain the block data request and the corresponding blockchain reference from the request indication 165. Further, the blockchain network node 103*a-c* can validate the block data request based on the cryptographic digital asset reference. The blockchain network node 103*a-c* can then obtain the block data associated with the cryptographic digital asset 115 that includes the container identifier code 117 and the carbon footprint information reference 119. The blockchain network node 103*a-c* can send, to the POS device 121 over the network 141, an indication 166 that includes the block data associated with the cryptographic digital asset 115.

Moreover, the POS device 121 can receive the indication 166 that includes the block data associated with the cryptographic digital asset 115. The POS device 121 can obtain the container identifier code 117 based on the received block data. Further, the POS device 121 can verify or authenticate the container identifier code 117 based on a public key or a private key associated with the container identifier code 117. The POS device 121 can obtain the carbon footprint information reference 119 based on the received block data. If the carbon footprint information reference 119 is coded, then the POS device 121 can obtain the carbon footprint information reference based on the corresponding code 119 and a public key or a private key associated with the corresponding code 119. The carbon footprint information reference represents a reference to carbon footprint information associated with checked out items by the POS device 121 that utilized the container 151. In one example, the carbon footprint information reference includes a uniform resource locator (URL) to a network node that is configured to have access to the corresponding carbon footprint information. In another example, the carbon footprint information reference is associated with account information (e.g., URL, user name, password) that enables access to the corresponding carbon footprint information. In yet another example, the carbon footprint information reference is associated with a database that stores the corresponding carbon footprint information. In yet another example, the carbon footprint information reference is associated with the corresponding carbon footprint information stored on the blockchain 105.

In another embodiment, in response to receiving a scanned item during checkout by the POS device 121, the POS device 121 can determine or obtain an item that is a lower carbon footprint alternative to a scanned item based on transaction information and packaging information associated with the scanned item. The POS device 121 can then output, for display, a visual representation associated with the alternative item.

In another embodiment, during checkout of one or more items, the POS device 121 can obtain transaction information associated with a scanned item. The POS device 121 can send, to the network node 131 over the network 141, an indication 161 that includes that transaction information. The network node 131 can then obtain one or more items that is a lower carbon footprint alternative to the scanned item based on carbon footprint information associated with both the scanned item and the one or more alternative items obtained from the carbon footprint information database 133. The network node 131 can then send, to the POS device 121 over the network 141, an indication 162 that includes the one or more alternative items, which may include carbon footprint information associated with the scanned item or the one or more alternative items.

In another embodiment, the POS device 121 can obtain a scanned item during checkout by the POS device 121. The POS device 121 can then obtain carbon footprint information specific to the scanned item. In one example, the POS device 121 can query a carbon footprint information database based on the scanned item, with the POS device 121 being configured to access that database. In another example, the POS device 121 can send, to the network node 131 over the network 141, an indication 163 that includes a request for carbon footprint information specific to the scanned item. The network node 131 can receive the request and in response, obtain carbon footprint information specific to the scanned item such as from a carbon footprint information database 133 configured to enable access to the carbon footprint information stored in that database 133. Further, the database 133 can be configured to: create, modify and remove definitions that define the organization of the carbon footprint information; insert, modify or delete data, provide data in a form directly usable or for further processing by other applications; or register or monitor users, enforce data security, monitor performance, maintain data integrity, deal with concurrency control, and recover information that has been corrupted by some event (e.g., unexpected system failure). The network node 131 can then send, to the POS device 121 over the network 141, an indication 164 that includes the carbon footprint information specific to the scanned item (e.g., packaging information, product information).

In another embodiment, the POS device 121 can obtain one or more scanned items during checkout by the POS device 121. Further, the POS device 121 can obtain transaction information associated with the one or more scanned items. The POS device 121 can also obtain the carbon footprint information reference based on the carbon footprint information reference 119 obtained from the corresponding cryptographic digital asset 115 stored on the blockchain 105. In addition, the POS device 121 can obtain a public key or a private key associated with the carbon footprint information reference 119. The POS device 121 can determine a source (e.g., network node 103*a-c*, 131, database 133, blockchain 105) of carbon footprint information associated with the utilization of the container 151 based on the carbon footprint information reference. The POS device 121 can send, to the source, an indication that includes the transaction information associated with the one or more scanned items, which can include the carbon footprint information reference, the cryptographic digital asset reference, or a user identifier associated with a user of the container 151. The source can receive that indication and in response, store the transaction information based on the carbon footprint information reference, the cryptographic digital asset reference, or the user identifier. By doing so, a carbon footprint profile of an item can be generated, updated, and tracked such as to determine an alternative item having a lower carbon footprint, identify the packaging that can be recycled or discarded, provide processing instructions for that item (e.g., separation, rinsing, cleaning), the effort that may be required (e.g., estimated effort) to perform such processing instructions, or the like. All or a portion of the carbon footprint profile of that item can then be obtained at checkout, by the POS device 121, from the source, to perform certain tasks such as outputting, for display, the alternative item, sending a text message or an email that includes the recycling information, or the like.

In another embodiment, the network node 131 can receive, from the POS device 121 over the network 141, an indication 161 that includes transaction information associated with one or more scanned items during a current checkout by the POS device 121. Further, the network node 131 can obtain the carbon footprint information reference 119 associated with the cryptographic digital asset 115 stored on the blockchain 105 by sending an indication 167 that includes a request for corresponding block data and in response, receiving an indication 168 that includes the corresponding block data having the carbon footprint information reference 119. The network node 131 can obtain the transaction information associated with previous transactions by the POS device 121 that utilized the container 151 based on the carbon footprint information reference 119. The network node 131 can determine an incentive (e.g., discount, rebate, promotion) associated with the current transaction based on the current transaction information or the previous transaction information. The network node 131 can then send, to the POS device 121 over the network 141, an indication 169 that includes the incentive 169 to apply to the current transaction.

In another embodiment, the POS device 121 or the network node 131 can send, to a blockchain network node 103*a-c*, an indication that includes a request to register a new transaction on the blockchain, the container identifier code, the carbon footprint information reference (coded or uncoded), and the transaction information associated with the checkout of one or more items by the POS device 121. The blockchain network node 103*a-c* receives the indication and in response, registers a new transaction on the blockchain 105 that includes the container identifier code, the carbon footprint information reference (coded or unencoded), and the transaction information associated with the checkout of one or more items by the POS device 121.

Figure 2A:
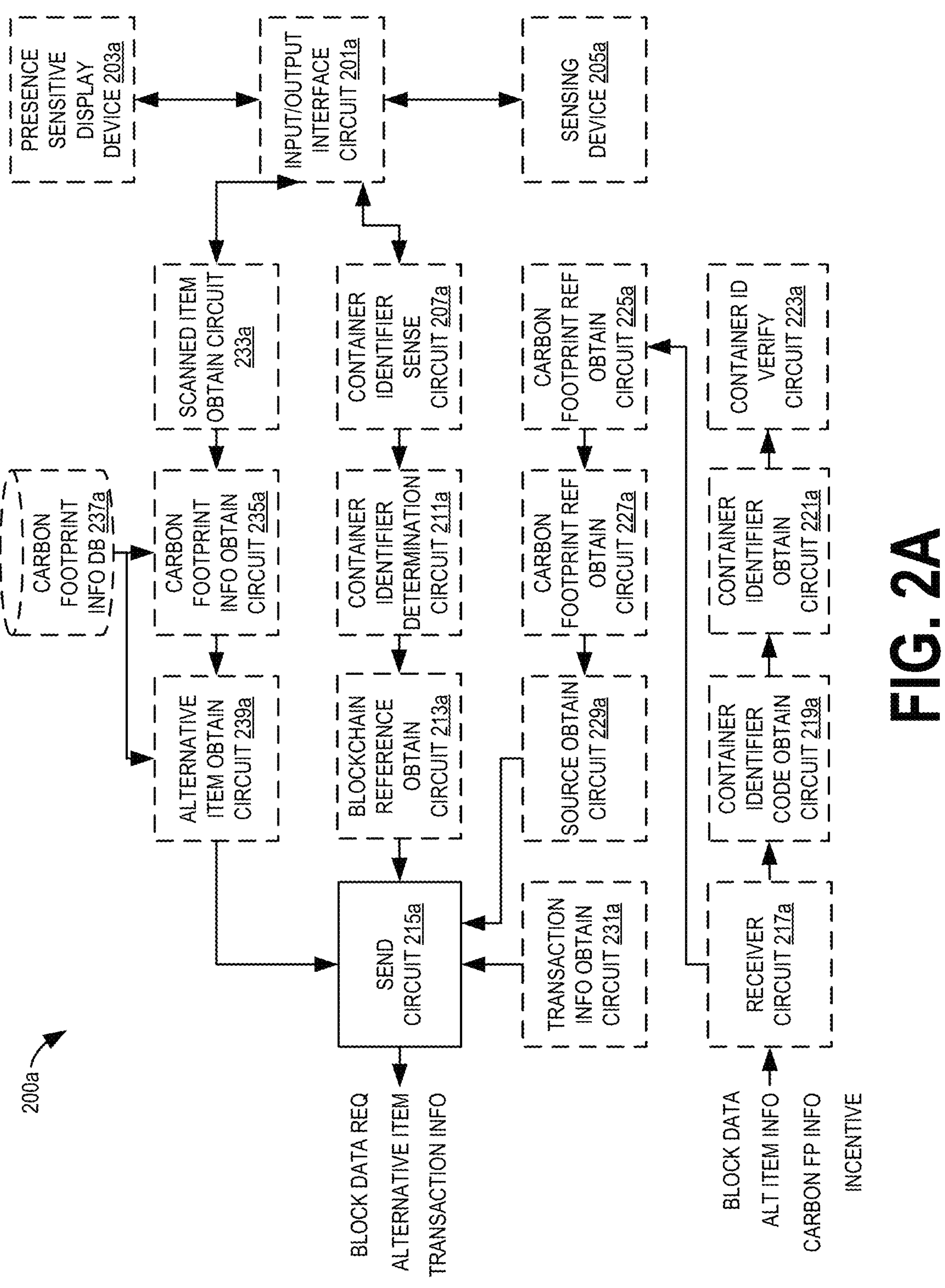
FIG. 2A illustrates one embodiments of a POS device in accordance with various aspects as described herein.

FIG. 2A illustrates one embodiment of a POS device 200*a* in accordance with various aspects as described herein. In FIG. 2A, the device 200*a* implements various functional means, units, or modules (e.g., via the processing circuitry 301*a* in FIG. 3A, via the processing circuitry 501 in FIG. 5, via software code, or the like), or circuits. In one embodiment, these functional means, units, modules, or circuits (e.g., for implementing the method(s) described herein) may include for instance: an input/output interface circuit 201*a* operable to provide a communication interface to an input device, output device, or input and output device such as a presence sensitive display device 203*a* (e.g., touchpad display), a sensing device 205*a* (e.g., camera, QR or bar code scanner, RFID device, NFC device), LED, keypad, payment reader, printer, credit card reader, the like, or any combination thereof; a container identifier sense circuit 207*a* operable to obtain a sensed container identifier from the sensing device 205*a* via the input/output interface circuit 201*a*; a container identifier determination circuit 211*a* operable to obtain a container identifier value from the sensed container identifier; a blockchain reference obtain circuit 213*a* operable to obtain a blockchain reference based on the container identifier value; a send circuit 215*a* operable to send information; a receiver circuit 217*a* operable to receive information; a container identifier code obtain circuit 219*a* operable to obtain a container identifier code from block data; a container identifier obtain circuit 221*a* operable to obtain a container identifier from the corresponding code; a container identifier verification circuit 223*a* operable to verify the container identifier; a carbon footprint information reference obtain circuit 225*a* operable to obtain a carbon footprint information reference (coded or uncoded) from a blockchain network; a carbon footprint information reference obtain circuit 227*a* operable to obtain a carbon footprint information reference from the corresponding code (if the carbon footprint information reference is coded); a source obtain circuit 229*a* operable to obtain a source (e.g., network node, database, account) of the carbon footprint information based on the carbon footprint information reference; a transaction information obtain circuit 231*a* operable to obtain transaction information during checkout of one or more items by the POS device; a scanned item obtain circuit 233*a* operable to obtain one or more scanned items during checkout by the POS device; a carbon footprint information obtain circuit 235*a* operable to obtain, such as from a carbon footprint information database 237*a*, carbon footprint information associated with one or more scanned items during checkout by the POS device; and an alternative item obtain circuit 239*a* operable to obtain, such as from a carbon footprint information database 237*a*, one or more alternative items associated with one or more scanned items during checkout by the POS device based on carbon footprint information associated with the one or more scanned items or the one or more alternative items.

Figure 2B:
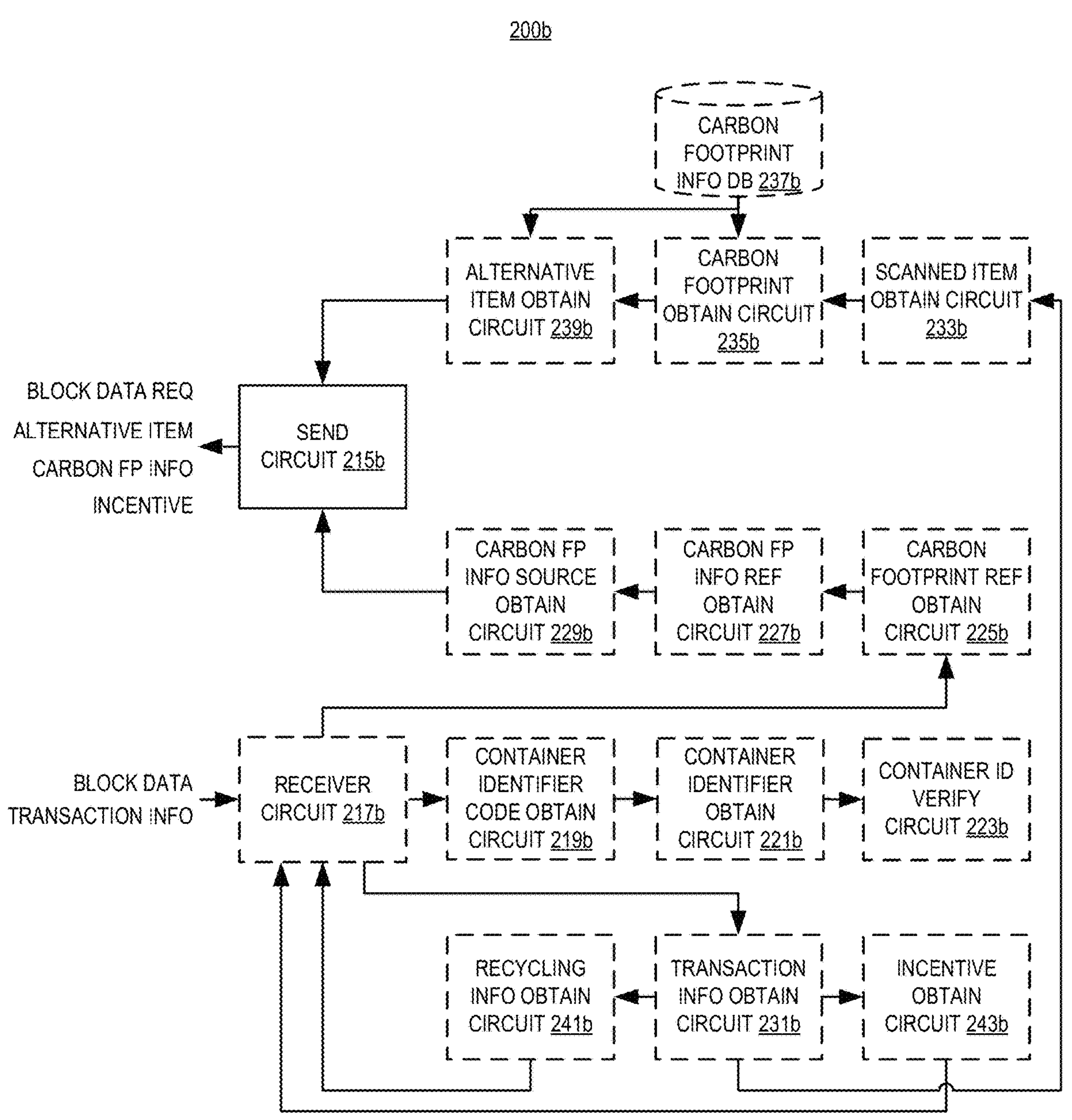
FIGS. 2B-C illustrate embodiments of a network node in accordance with various aspects as described herein.

FIG. 2B illustrates one embodiment of a network node 200*b* in accordance with various aspects as described herein. In FIG. 2B, the device 200*b* implements various functional means, units, or modules (e.g., via the processing circuitry 301*b* in FIG. 3B, via software code, or the like), or circuits. In one embodiment, these functional means, units, modules, or circuits (e.g., for implementing the method(s) described herein) may include for instance: a send circuit 215*b* operable to send information; a receiver circuit 217*b* operable to receive information; a container identifier code obtain circuit 219*b* operable to obtain a container identifier code from block data; a container identifier obtainer circuit 221*b* operable to obtain a container identifier based on the container identifier code; a container identifier verification circuit 223*b* operable to verify the container identifier; a carbon footprint information reference obtain circuit 225*b* operable to obtain a carbon footprint information reference (coded or uncoded) from a blockchain network; a carbon footprint information reference obtain circuit 227*b* operable to obtain a carbon footprint information reference from the corresponding code; a carbon footprint information source obtain circuit 229*b* operable to obtain a source (e.g., network node, database, account) configured to enable access to the carbon footprint information based on the carbon footprint information reference; a transaction information obtain circuit 231*b* operable to obtain transaction information of one or more scanned items during checkout by the POS device; a scanned item obtain circuit 233*b* operable to obtain one or more scanned items during checkout by the POS device; a carbon footprint information obtain circuit 235*b* operable to obtain, such as from a carbon footprint information database 237*b* which may be accessed locally or remotely, carbon footprint information associated with one or more scanned items during checkout by the POS device; an alternative item obtain circuit 239*b* operable to obtain, such as from the carbon footprint information database 237*b*, one or more alternative items associated with one or more scanned items during checkout by the POS device based on carbon footprint information associated with the one or more scanned items or the one or more alternative items; a recycling information obtain circuit 241*b* operable to obtain recycling information associated with one or more scanned items during checkout by the POS device; and an incentive obtain circuit 243*b* operable to obtain an incentive associated with one or more scanned items during checkout by the POS device.

Figure 2C:
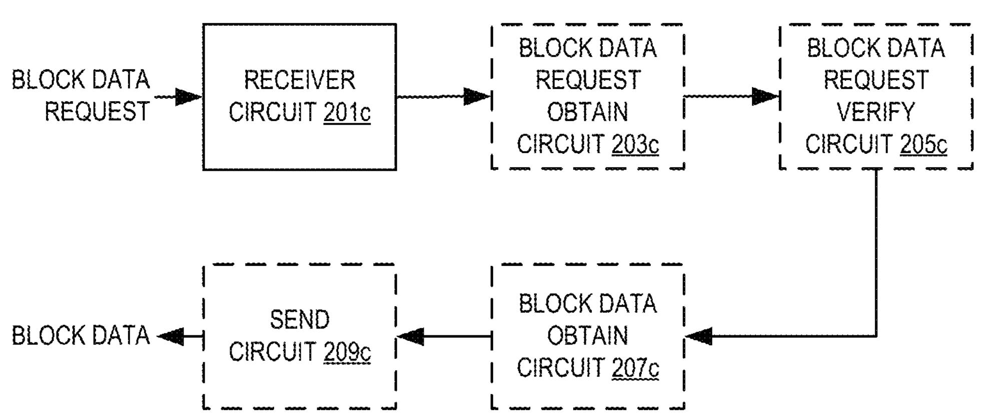

FIG. 2C illustrates one embodiment of a blockchain network node device 200*c* in accordance with various aspects as described herein. In FIG. 2C, the device 200*c* implements various functional means, units, or modules (e.g., via the processing circuitry 301*b* in FIG. 3B, via software code, or the like), or circuits. In one embodiment, these functional means, units, modules, or circuits (e.g., for implementing the method(s) herein) may include for instance: a receiver circuit 201*c* operable to receive communications; a block data request obtain circuit 203*c* operable to obtain a block data request and a cryptographic digital asset reference from the received request indication; a block data request validation circuit 205*c* operable to verify the block data request based on the cryptographic digital asset reference; a block data obtain circuit 207*c* operable to obtain block data based on the cryptographic digital asset reference; and a send circuit 209*c* operable to send communications.

Figures 3A, 3B:
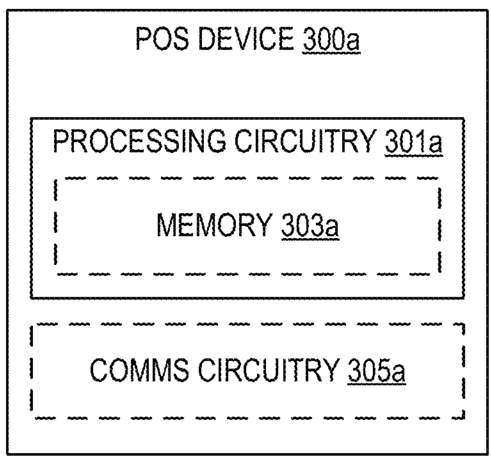
FIG. 3A illustrates another embodiment of a POS device in accordance with various aspects as described herein.
FIG. 3B illustrates another embodiment of a network node in accordance with various aspects as described herein.

FIG. 3A illustrates another embodiment of a POS device 300*a* in accordance with various aspects as described herein. In FIG. 3A, the device 300*a* may include processing circuitry 301*a* that is operably coupled to memory 303*a*, network communications circuitry 305*a*, the like, or any combination thereof. The network communication circuitry 305*a* is configured to transmit and/or receive information to and/or from one or more other network node devices via any communication technology. The processing circuitry 301*a* is configured to perform processing described herein, such as by executing instructions stored in memory 303*a*. The processing circuitry 301*a* in this regard may implement certain functional means, units, or modules.

FIG. 3B illustrates another embodiment of a network node device 300*b* in accordance with various aspects as described herein. In FIG. 3B, the device 300*b* may include processing circuitry 301*b* that is operably coupled to memory 303*b*, network communications circuitry 305*b*, the like, or any combination thereof. The network communication circuitry 305*b* is configured to transmit and/or receive information to and/or from one or more other network node devices via any communication technology. The processing circuitry 301*b* is configured to perform processing described herein, such as by executing instructions stored in memory 303*b*. The processing circuitry 301*b* in this regard may implement certain functional means, units, or modules.

Figure 4A:
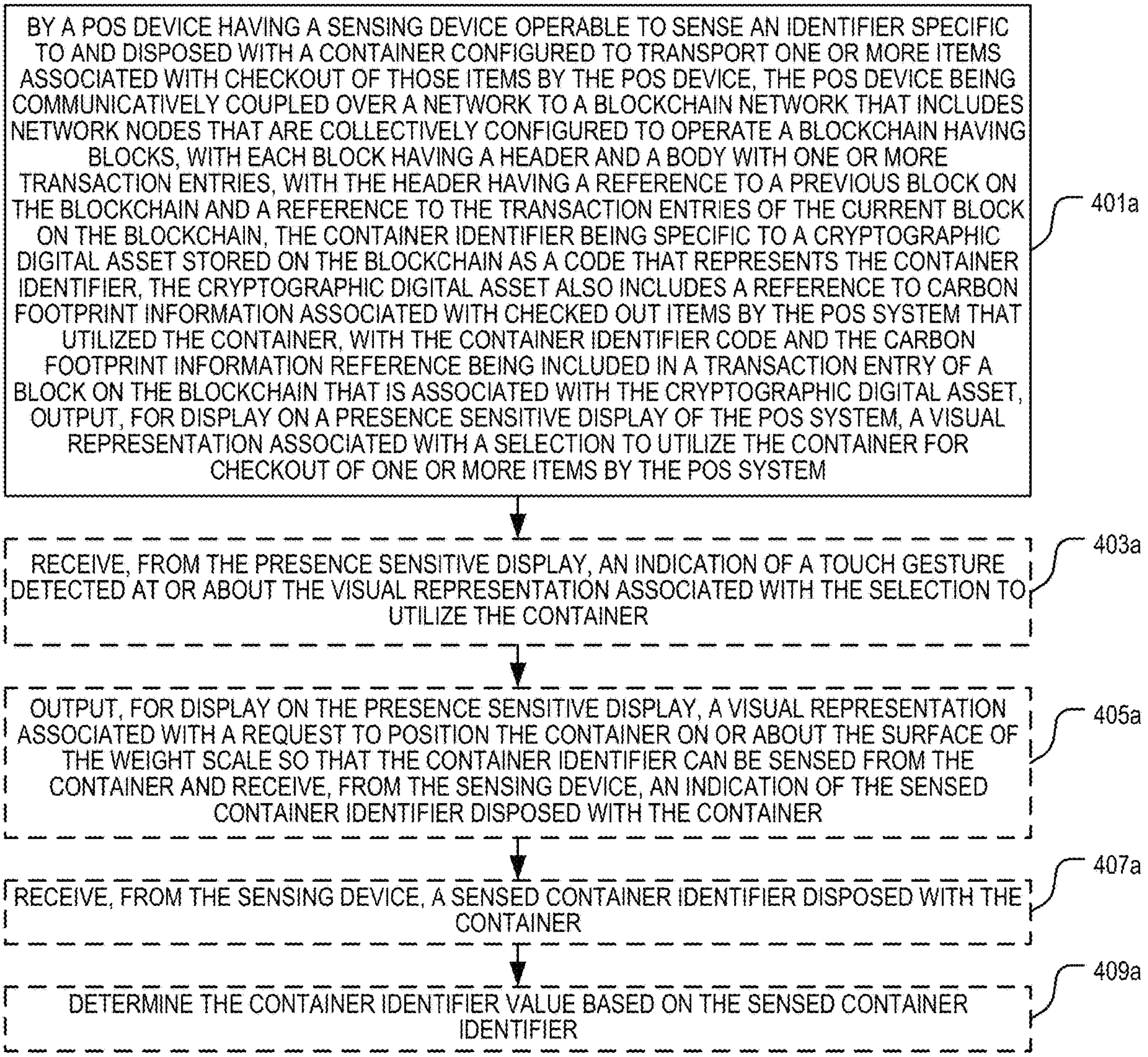

FIG. 4A illustrates one embodiment of a method 400*a* performed by a POS device 121, 200*a*, 300*a*, 500 of obtaining carbon footprint information of items checked out by the POS device 121, 200*a*, 300*a*, 500 in accordance with various aspects as described herein. In FIG. 4A, the method

400*a* may start, for instance, at block 401*a* where it includes outputting, for display on a presence sensitive display of the POS device 121, 200*a*, 300*a*, 500, a visual representation associated with a selection to utilize the container for checkout of one or more items by the POS device 121, 200*a*, 300*a*, 500. At block 403*a*, the method 400*a* may include receiving, from the presence sensitive display, an indication of a touch gesture detected at or about the visual representation associated with the selection to utilize the container. The method 400*a* may include outputting, for display on the presence sensitive display, a visual representation associated with a request to position the container on or about the surface of the weight scale so that the container identifier can be sensed from the container and receiving, from the sensing device, an indication of the sensed container identifier disposed with the container, as represented by block 405*a*. At block 407*a*, the method 400*a* may include receiving, from the sensing device, a sensed container identifier disposed with the container. At block 409*a*, the method 400*a* may include determining the container identifier value based on the sensed container identifier.

Figure 4B:
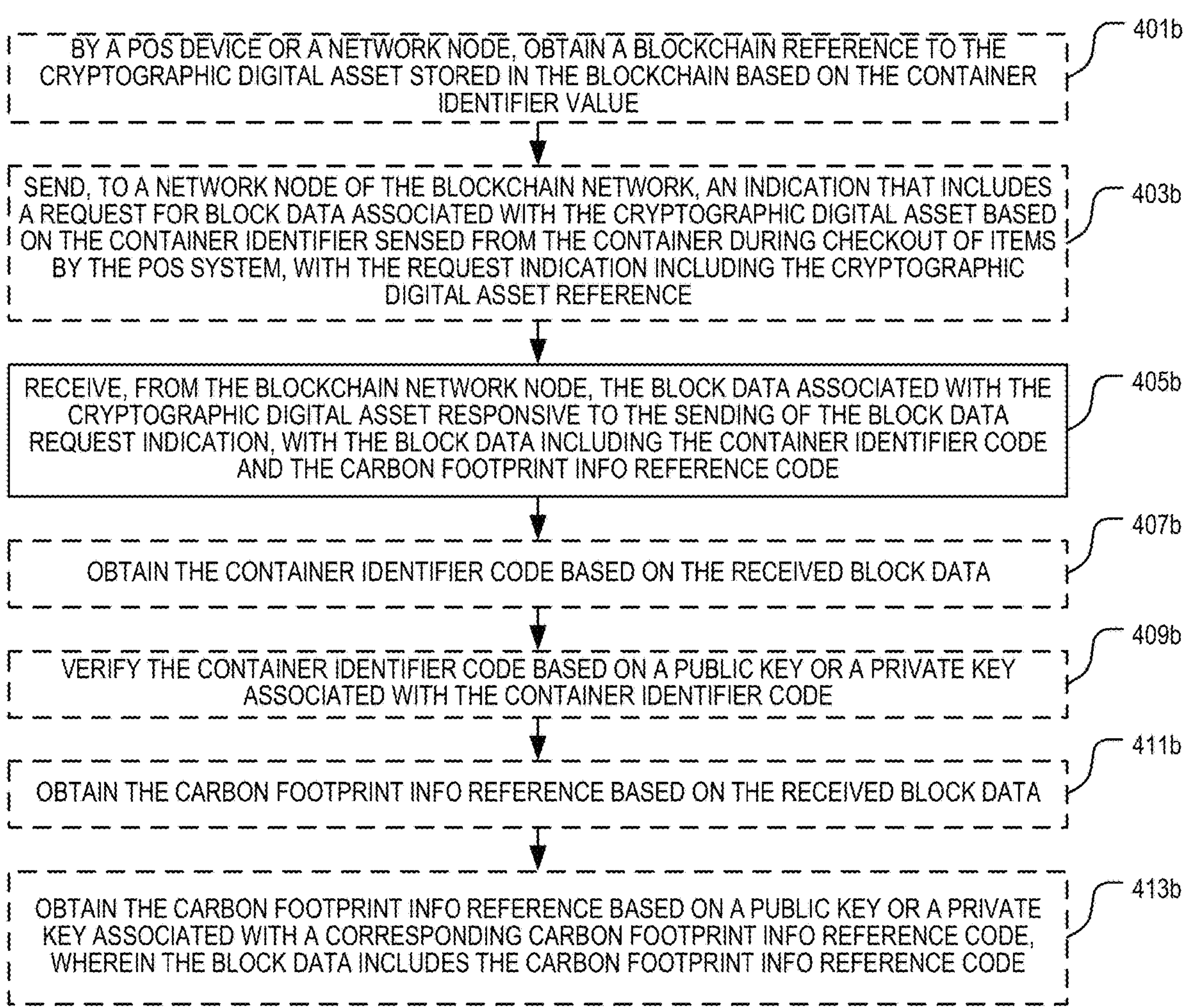

FIG. 4B illustrates another embodiment of a method 400*b* performed by a POS device 121, 200*a*, 300*a*, 500 or a network node 131, 200*b*, 300*b* of obtaining carbon footprint information of items checked out by the POS device 121, 200*a*, 300*a*, 500 in accordance with various aspects as described herein. In FIG. 4B, the method 400*b* may start, for instance, at block 401*b* where it may include obtaining a blockchain reference to the cryptographic digital asset stored on the blockchain based on the container identifier value. At block 403*b*, the method 400*b* may include sending, to a blockchain network node 103*a-c*, 200*c*, 300*b*, an indication that includes a request for block data associated with the cryptographic digital asset based on the container identifier sensed from the container during the checkout. At block 405*b*, the method 400*b* includes receiving, from the blockchain network node 103*a-c*, 200*c*, 300*b*, the block data associated with the cryptographic digital asset. At block 407*b*, the method 400*b* may include obtaining the container identifier code based on the received block data. At block 409*b*, the method 400*b* may include verifying the container identifier code based on a public key or a private key associated with the container identifier code. The method 400*b* may include obtaining the carbon footprint information reference (coded or uncoded) based on the received block data, as represented by block 411*b*. At block 413*b*, the method 400*b* may include obtaining the carbon footprint information reference based on the corresponding code and a public key or a private key associated with the corresponding code, with the received block data having the corresponding code.

Figure 4C:
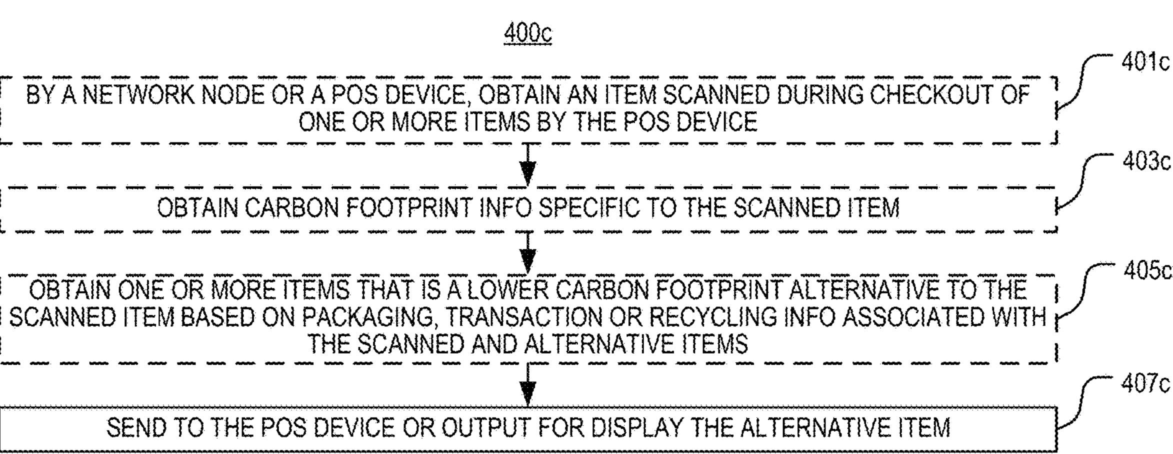

FIG. 4C illustrates another embodiment of a method 400*c* performed by a POS device 121, 200*a*, 300*a*, 500 or a network node 131, 200*b*, 300*b* of obtaining carbon footprint information of items checked out by the POS device 121, 200*a*, 300*a*, 500 in accordance with various aspects as described herein. In FIG. 4C, the method 400*c* may start, for instance, at block 401*c* where it may include obtaining an item scanned during checkout by the POS device 121, 200*a*, 300*a*, 500, as represented by block 401*c*. At block 403*c*, the method 400*c* may include obtaining carbon footprint information specific to the scanned item. At block 405*c*, the method 400*c* may include obtaining an item that is a lower carbon footprint alternative to the scanned item based on the packaging, transaction or recycling information associated with the scanned item or the alternative item. At block 407*c*, the method 400*c* includes sending, to the POS device 121, 200*a*, 300*a*, 500, an indication that includes the alternative item. Additionally or alternatively, the method 400*c* may include outputting, for display, a visual representation associated with the alternative item.

Figure 4D:
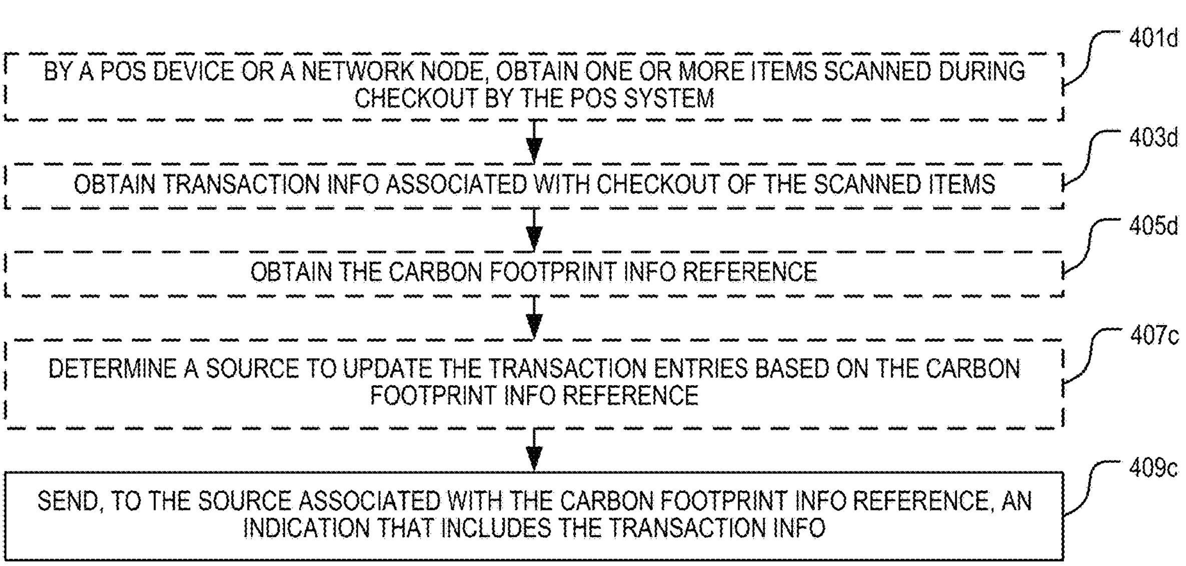

FIG. 4D illustrates another embodiment of a method 400*d* performed by a POS device 121, 200*a*, 300*a*, 500 or a network node 131, 200*b*, 300*b* of obtaining carbon footprint information of items checked out by the POS device 121, 200*a*, 300*a*, 500 in accordance with various aspects as described herein. In FIG. 4D, the method 400*d* may start, for instance, at block 401*d* where it may include obtaining one or more items scanned during checkout by the POS system that utilized the container such as by scanning the container identifier. At block 403*d*, the method 400*d* may include obtaining transaction information associated with the scanned items. At block 405*d*, the method 400*d* may include obtaining the carbon footprint information reference. The method 400*d* may include determining a source (e.g., database, network node, blockchain network node) operable to enable access (e.g., read, write, append, modify, store) to the carbon footprint information associated with the container based on the carbon footprint info reference, as represented by block 407*d*. At block 409*c*, the method 400*d* includes sending, to that source, an indication that includes the transaction information. In one example, the method 400*d* sends, to a blockchain network node 103*a-c*, 200*c*, 300*b*, an indication that includes a request to register a new transaction on the blockchain 105, with the indication including the container identifier code, the carbon footprint information reference (coded or uncoded), and the transaction information associated with the checkout of one or more items by the POS device 121, 200*a*, 300*a*, 500.

Figure 4E:
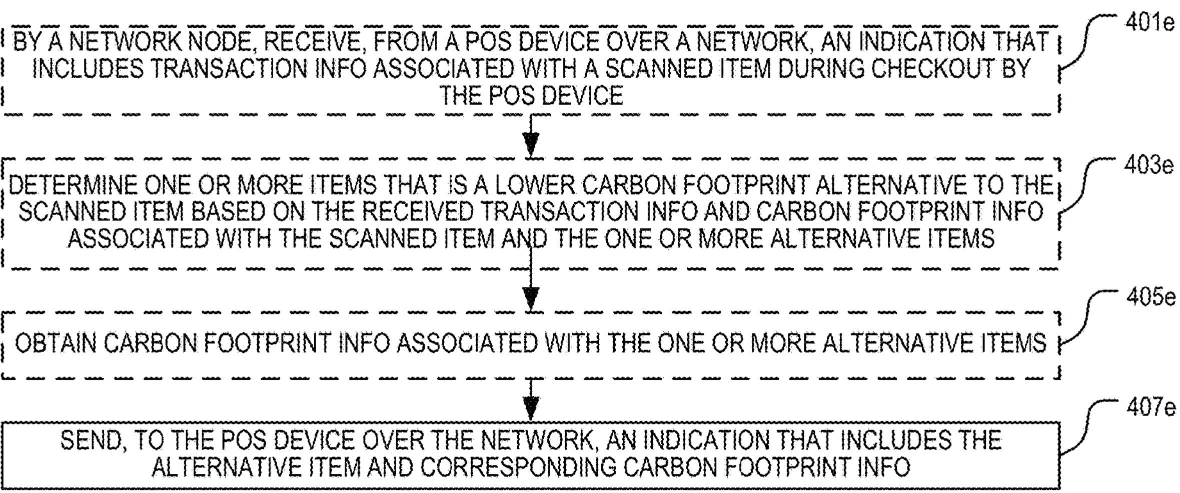

FIG. 4E illustrates one embodiment of a method 400*e* performed by a network node 131, 200*b*, 300*b* of obtaining carbon footprint information of items checked out by a POS device 121, 200*a*, 300*a*, 500 in accordance with various aspects as described herein. In FIG. 4E, the method 400*e* may start, for instance, at block 401*e* where it may include receiving, from a POS device 121, 200*a*, 300*a*, 500 over a network, an indication that includes transaction information associated with a scanned item during checkout by the POS device 121, 200*a*, 300*a*, 500. At block 403*e*, the method 400*e* may include determining one or more items that is a lower carbon footprint alternative to the scanned item based on the received transaction information and carbon footprint information associated with the scanned item and the one or more alternative items. At block 405*e*, the method 400*e* may include obtaining carbon footprint information associated with the one or more alternative items. At block 407*e*, the method 400*e* may include sending, to the POS device 121, 200*a*, 300*a*, 500, an indication that includes the one or more alternative items and corresponding carbon footprint information.

Figure 4F:
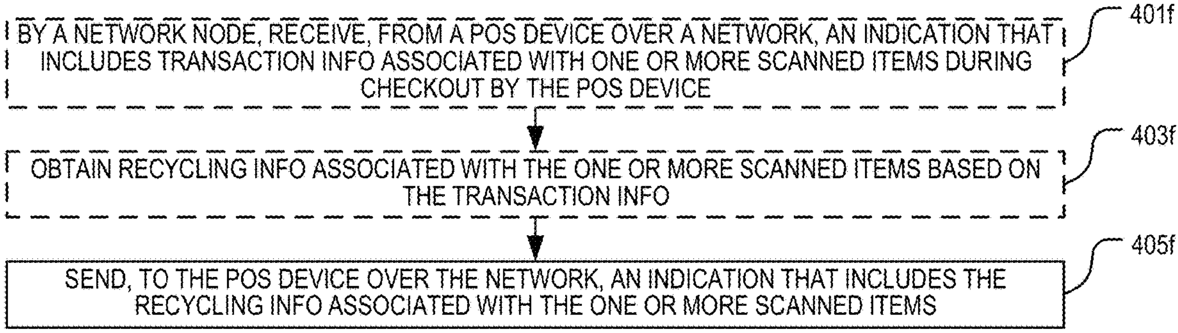

FIG. 4F illustrates one embodiment of a method 400*f* performed by a network node 131, 200*b*, 300*b* of obtaining carbon footprint information of items checked out by a POS device 121, 200*a*, 300*a*, 500 in accordance with various aspects as described herein. In FIG. 4F, the method 400*f* may start, for instance, at block 401*f* where it may include receiving, from a POS device 121, 200*a*, 300*a*, 500 over a network, an indication that includes transaction information associated with one or more scanned item during checkout by the POS device 121, 200*a*, 300*a*, 500. At block 403*f*, the method 400*f* may include obtaining recycling information associated with the one or more scanned item. In one example, the method 400*f* can query a carbon footprint information database that includes recycling information associated with the one or more scanned items. At block 405*f*, the method 400*f* includes sending, to the POS device 121, 200*a*, 300*a*, 500, an indication that includes recycling information associated with the one or more scanned items.

Figure 4G:
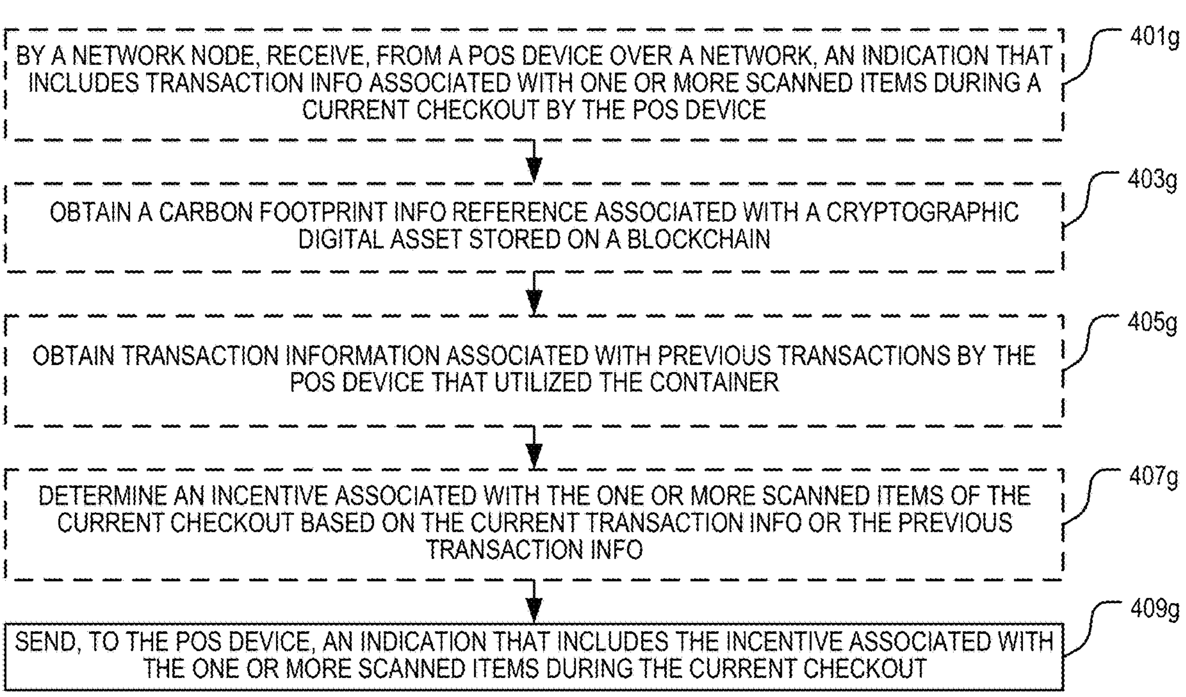

FIG. 4G illustrates one embodiment of a method 400*g* performed by a network node 131, 200*b*, 300*b* of obtaining carbon footprint information of items checked out by a POS device 121, 200*a*, 300*a*, 500 in accordance with various aspects as described herein. In FIG. 4G, the method 400*g* may start, for instance, at block 401*g* where it may include receiving, from a POS device 121, 200*a*, 300*a*, 500 over a network, an indication that includes transaction info associated with one or more scanned items during a current checkout by the POS device 121, 200*a*, 300*a*, 500. At block 403*g*, the method 400*g* may include obtaining a carbon footprint information reference associated with a cryptographic digital asset stored on a blockchain. At block 405*g*, the method 400*g* may include obtaining transaction information associated with one or more scanned items during a previous checkout by the POS device 121, 200*a*, 300*a*, 500 based on the carbon footprint info reference. At block 407*g*, the method 400*g* may include determining an incentive (e.g., discount, rebate, promotion) associated with the one or more scanned items of the current checkout based on the current transaction info or the previous transaction info. At block 409*g*, the method 400*g* includes sending, to the POS device 121, 200*a*, 300*a*, 500, an indication that includes the incentive associated with the one or more scanned items during the current checkout. Additionally or alternatively, the method 400*g* may include sending a text message or an email message that includes the incentive based on a user account associated with the container that includes a mobile number or an email address.

FIG. 4H illustrates one embodiment of a method 400*h* performed by a blockchain network node 103*a-c*, 200*c*, 300*b* of obtaining carbon footprint information of items checked out by a POS device 121, 200*a*, 300*a*, 500 in accordance with various aspects as described herein. In FIG. 4H, the method 400*h* may start, for instance, at block 401*h* where it may include receiving, from the POS system 121, 200*a*, 300*a*, 500 over a network, an indication that includes a request for block data associated with the cryptographic digital asset and the cryptographic digital asset reference. At block 403*h*, the method 400*h* may include obtaining the block data request and the corresponding blockchain reference based on the request indication. The method 400*h* may include verifying the block data request based on the cryptographic digital asset reference, as referenced by block 405*h*. At block 407*h*, the method 400*h* may include obtaining the block data associated with the cryptographic digital asset based on the cryptographic digital asset reference. At block 409*h*, the method 400*h* includes sending, to the POS device 121, 200*a*, 300*a*, 500 over the network, an indication that includes the block data associated with the cryptographic digital asset.

Figure 5:
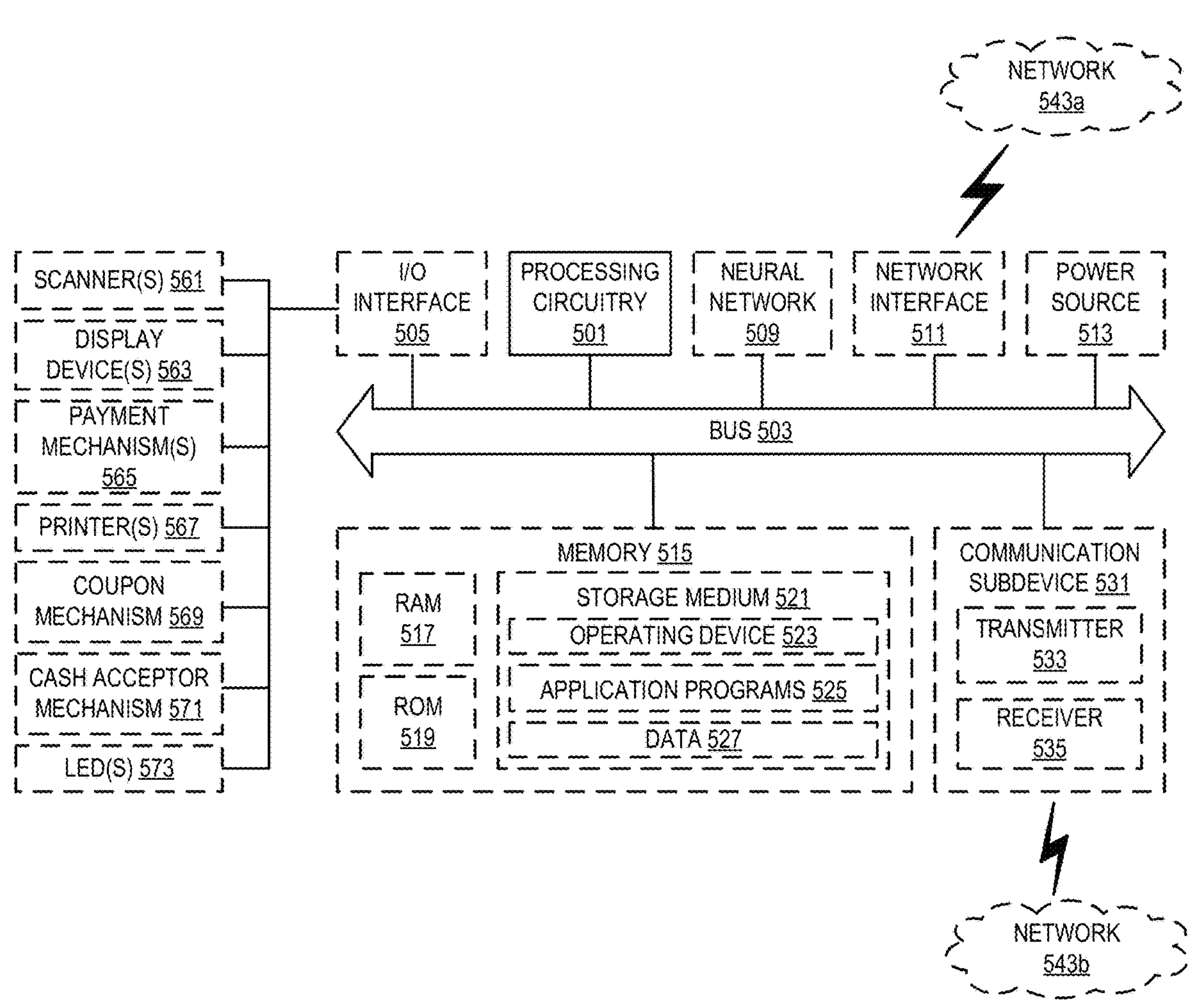
FIG. 5 illustrates another embodiment of a POS device in accordance with various aspects as described herein.

FIG. 5 illustrates another embodiment of a POS device 500 in accordance with various aspects as described herein. In FIG. 5, device 500 includes processing circuitry 501 that is operatively coupled to input/output interface 505, neural network circuit 509, network connection interface 511, power source 513, memory 515 including random access memory (RAM) 517, read only memory (ROM) 519 and storage medium 521, communication subsystem 531, and/or any other component, or any combination thereof.

The input/output interface 505 may be configured to provide a communication interface to an input device, an output device, or an input and output device. The device 500 may be configured to use an output device via input/output interface 505. An output device may use the same type of interface port as an input device. For example, a USB port, a Bluetooth port, a near field communication (NFC) port, or the like may be used to provide input to and output from the device 500. The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, an optical sensor, (e.g., a digital camera, a digital video camera, a web camera, a scanner, etc.), a scanner, a weight scale, a microphone, a sensor, a mouse, a trackball, a directional pad, a trackpad, a scroll wheel, a smartcard, and the like. In one example, the input device may be a combined scale and scanner. The scale can be operable to weigh one or more items placed on a transparent window associated with the combined scale and scanner. The scanner can be operable to scan an identifier (e.g., barcode, Q/R code, RF ID) disposed with a scanned item. The presence-sensitive display may include a capacitive or resistive touch sensor to sense input from a user. As shown in FIG. 5, the input/output interface 505 can be configured to provide a communication interface to various input/output components such as a scanners or sensors 561, a display device 563, a payment processing mechanism 565, a printer 567, a coupon slot mechanism 569, a cash acceptor mechanism 571, a light emitting device 573, the like, or any combination thereof. A sensor may be, for instance, an accelerometer, a gyroscope, an RFID detector device, an NFC detector device, a tilt sensor, a force sensor, a magnetometer, an optical or image sensor, an infrared sensor, a proximity sensor, another like sensor, or any combination thereof.

In FIG. 5, storage medium 521 may include operating system 523, application program 525, data 527, resolution data 529, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the neural network circuit 509 may be configured to learn to perform tasks by considering examples such as performing object detection of certain objects in an image. In FIG. 5, the network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500*a-b* to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the device 500*a-b*.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a POS device having a sensing device operable to sense an identifier specific to and disposed with a container configured to transport one or more items associated with checkout of those items by the POS device. Further, the POS device is communicatively coupled over a network to a blockchain network that includes network nodes that are collectively configured to operate a blockchain having blocks. Each block includes a header and a body with one or more transaction entries, with the header having a reference to a previous block on the blockchain and a reference to the transaction entries of the current block on the blockchain. The container identifier is specific to a cryptographic digital asset stored on the blockchain as a code that represents the container identifier. The cryptographic digital asset also includes a code that represents a reference to carbon footprint information associated with checked out items by the POS device that utilized the container. In addition, the container identifier code and the carbon footprint information reference code is included in a transaction entry of a block on the blockchain that is associated with the cryptographic digital asset. The method includes sending, to a network node of the blockchain network over the network, an indication that includes a request for block data associated with the cryptographic digital asset based on the container identifier sensed from the container during checkout of one or more items by the POS device so that the carbon footprint information associated with the checked out items by the POS device that utilized the container can be obtained based on the carbon footprint information reference code.

In another exemplary embodiment, the method further includes receiving, from the blockchain network node over the network, the block data associated with the cryptographic digital asset responsive to the sending of the block data request indication.

In another exemplary embodiment, the method further includes obtaining the carbon footprint information reference code based on the received block data.

In another exemplary embodiment, the method further includes obtaining the carbon footprint information reference based on the carbon footprint information reference code and a public key or a private key associated with the carbon footprint information reference code.

In another exemplary embodiment, the method further includes obtaining transaction information specific to the one or more checked out items by the POS device that utilized the container. In addition, the method further includes sending, by the POS device, to a network node associated with the carbon footprint information reference, the transaction information.

In another exemplary embodiment, the method further includes receiving, by the POS device, from a network node associated with the carbon footprint information reference, an indication that includes an item that is a lower carbon footprint alternative to a corresponding checked out item. Further, the network node associated with the carbon footprint information reference is operable to determine the alternative item based on transaction information specific to the corresponding checked out item and packaging information specific to the corresponding checked out item. In addition, the method further includes outputting, for display by the POS device, a visual representation associated with the alternative item.

In another exemplary embodiment, the method further includes receiving, by the POS device, from a network node associated with the carbon footprint information reference, an indication that includes recycling information associated with the one or more checked out items. In addition, the method further includes outputting, for display by the POS device, a visual representation associated with the recycling information.

In another exemplary embodiment, the method further includes receiving, by the POS device, from a network node associated with the carbon footprint information reference, an indication that includes an incentive associated with the one or more checked out items by the POS device that utilize the container. In addition, the method further includes outputting, for display by the POS device, a visual representation associated with the incentive.

In another exemplary embodiment, a network node that is communicatively coupled to the POS device over the network is enabled to determine an incentive specific to the carbon footprint information associated with the checked out items by the POS device that utilized the container.

In another exemplary embodiment, the container identifier code includes a cryptographic token and a public key. Further, a private key associated with the container identifier code is issued to a digital wallet account associated with the cryptographic digital asset.

In another exemplary embodiment, the carbon footprint information reference code includes a cryptographic token and a public key. Further, a private key associated with the carbon footprint information reference code is issued to a digital wallet account associated with the cryptographic digital asset.

In another exemplary embodiment, the carbon footprint information reference includes a URL to a network node that is configured to have access to the carbon footprint information associated with the checked out items by the POS device that utilized the container.

In another exemplary embodiment, the carbon footprint information reference includes a reference to a database having the carbon footprint information associated with the checked out items by the POS device that utilized the container.

In one exemplary embodiment, a POS device includes a sensing device operable to sense an identifier specific to and disposed with a container configured to transport one or more items associated with checkout of those items by the POS device. Further, the POS device is communicatively coupled over a network to a blockchain network that includes network nodes that are collectively configured to operate a blockchain having blocks. Each block has a header and a body with one or more transaction entries, with the header having a reference to a previous block on the blockchain and a reference to the transaction entries of the current block on the blockchain. The container identifier is specific to a cryptographic digital asset stored on the blockchain as a code that represents the container identifier. The cryptographic digital asset also includes a code that represents a reference to carbon footprint information associated with checked out items by the POS device that utilized the container. In addition, the container identifier code and the carbon footprint information reference code is included in a transaction entry of a block on the blockchain that is associated with the cryptographic digital asset. The POS device further includes processing circuitry and a memory, with the memory containing instructions executable by the processing circuitry whereby the processing circuitry is configured to send, to a network node of the blockchain network over the network, an indication that includes a request for block data associated with the cryptographic digital asset based on the container identifier sensed from the container during checkout of one or more items by the POS device so that the carbon footprint information associated with the checked out items by the POS device that utilized the container can be obtained based on the carbon footprint information reference code.

In another exemplary embodiment, the memory includes further instructions executable by the processing circuitry whereby the processing circuitry is configured to receive, from the blockchain network node over the network, the block data associated with the cryptographic digital asset and to obtain the carbon footprint information reference code based on the received block data.

In another exemplary embodiment, the memory includes further instructions executable by the processing circuitry whereby the processing circuitry is configured to obtain the carbon footprint information reference based on the carbon footprint information reference code and a public key or a private key associated with the carbon footprint information reference code.

In another exemplary embodiment, the memory includes further instructions executable by the processing circuitry whereby the processing circuitry is configured to obtain transaction information associated with the one or more checked out items by the POS device that utilize the container and to send, to a network node associated with the carbon footprint information reference, the transaction information.

In another exemplary embodiment, the memory includes further instructions executable by the processing circuitry whereby the processing circuitry is configured to receive, from a network node associated with the carbon footprint information reference, an indication that includes an item that is a lower carbon footprint alternative to a corresponding checked out item. Further, the network node associated with the carbon footprint information reference is operable to determine the alternative item based on transaction information specific to the corresponding checked out item and packaging information specific to the corresponding checked out item. In addition, the memory includes further instructions executable by the processing circuitry whereby the processing circuitry is configured to output, for display, a visual representation associated with the alternative item.

In another exemplary embodiment, the memory includes further instructions executable by the processing circuitry whereby the processing circuitry is configured to receive, from a network node associated with the carbon footprint information reference, an indication that includes recycling information associated with the one or more checked out items and to output, for display, a visual representation associated with the recycling information.

In another exemplary embodiment, the memory includes further instructions executable by the processing circuitry whereby the processing circuitry is configured to receive, from a network node associated with the carbon footprint information reference, an indication that includes an incentive associated with the one or more checked out items by the POS device that utilize the container and to output, for display, a visual representation associated with the incentive.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise.

Relational terms such as “first” and “second,” and the like may be used solely to distinguish one entity or action from another entity or action without necessarily requiring or implying any actual such relationship or order between such entities or actions. The term “or” is intended to mean an inclusive “or” unless specified otherwise or clear from the context to be directed to an exclusive form. Further, the terms “a,” “an,” and “the” are intended to mean one or more unless specified otherwise or clear from the context to be directed to a singular form. The term “include” and its various forms are intended to mean including but not limited to. References to “one embodiment,” “an embodiment,” “example embodiment,” “various embodiments,” and other like terms indicate that the embodiments of the disclosed technology so described may include a particular function, feature, structure, or characteristic, but not every embodiment necessarily includes the particular function, feature, structure, or characteristic. Further, repeated use of the phrase “in one embodiment” does not necessarily refer to the same embodiment, although it may. The terms “substantially,” “essentially,” “approximately,” “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is “configured” in a certain way is configured in at least that way, but may also be configured in ways that are not listed.

What is claimed is:

1. A method, comprising:

by a point of sale (POS) device having a processing circuitry operationally coupled to a sensing device operable to sense an identifier specific to and disposed with a container configured to transport one or more items associated with checkout of those items by the POS device, the POS device being communicatively coupled over a network to a blockchain network that includes network nodes that are collectively configured to operate a blockchain having blocks, with each block having a header and a body with one or more transaction entries, with the header having a reference to a previous block on the blockchain and a reference to the transaction entries of the current block on the blockchain, the container identifier being specific to a cryptographic digital asset stored on the blockchain as a code that represents the container identifier, wherein verification of block data associated with the cryptographic digital asset is performed based on a hash value generated by applying a hashing algorithm to a block header of a previous block on the blockchain, the cryptographic digital asset also including a code that represents a reference to carbon footprint information associated with checked out items by the POS device that utilized the container, with the container identifier code and the carbon footprint information reference code being included in a transaction entry of a block on the blockchain that is associated with the cryptographic digital asset, sensing, via the sensing device, the identifier specific to and disposed with the container during a checkout of one or more items by the POS device;

sending, to a network node of the blockchain network over the network, an indication that includes a request for block data associated with the cryptographic digital asset based on the sensed container identifier sensed from the container during checkout, with the request indication including a blockchain reference to the cryptographic digital asset based on the sensed container identifier, so that the carbon footprint information associated with the checked out items by the POS device that utilized the container can be obtained based on the carbon footprint information reference;

receiving, from the network node of the blockchain network over the network, an indication that includes the block data associated with the cryptographic digital asset;

obtaining the carbon footprint information reference code from the block data;

obtaining the carbon footprint information reference based on the carbon footprint information reference code and a public key or a private key associated with the carbon footprint information reference code;

obtaining the carbon footprint information based on the carbon footprint information reference;

and outputting, for display by the POS device, a visual representation that includes at least a portion of the carbon footprint information.

2. The method of claim 1, further comprising:

receiving, from the blockchain network node over the network, the block data associated with the cryptographic digital asset responsive to the sending of the block data request indication.

3. The method of claim 1, further comprising:

determining a container identifier value based on the sensed container identifier; and obtaining the blockchain reference to the cryptographic digital asset based on the container identifier value.

4. The method of claim 3, further comprising:

obtaining the container identifier code from the block data; and verifying the container identifier code based on a public key or a private key associated with the container identifier code.

5. The method of claim 1, further comprising:

obtaining transaction information specific to the one or more checked out items by the POS device that utilized the container;

sending, by the POS device, to a network node associated with the carbon footprint information reference, an indication that includes the transaction information.

6. The method of claim 1, further comprising:

receiving, by the POS device, from a network node associated with the carbon footprint information reference, an indication that includes an item that is a lower carbon footprint alternative to a corresponding item of the one or more items during the checkout, wherein the network node associated with the carbon footprint information reference is operable to determine the alternative item based on packaging information, transaction information or recycling information specific to the corresponding item and the alternative item; and outputting, for display by the POS device, a visual representation associated with the alternative item.

7. The method of claim 1, further comprising:

receiving, by the POS device, from a network node associated with the carbon footprint information reference, an indication that includes recycling information associated with the one or more checked out items; and outputting, for display by the POS device, a visual representation associated with the recycling information.

8. The method of claim 1, further comprising:

receiving, by the POS device, from a network node associated with the carbon footprint information reference, an indication that includes an incentive associated with the one or more checked out items by the POS device that utilize the container, wherein the network node is enabled to determine an incentive specific to the carbon footprint information associated with the checked out items by the POS device that utilized the container; and outputting, for display by the POS device, a visual representation associated with the incentive.

9. The method of claim 1, wherein the container identifier code includes a cryptographic token and a public key, with a private key associated with the container identifier code being issued to a digital wallet account associated with the cryptographic digital asset.

10. The method of claim 1, wherein the carbon footprint information reference code includes a cryptographic token and a public key, with a private key associated with the carbon footprint information reference code being issued to a digital wallet account associated with the cryptographic digital asset.

11. The method of claim 1, wherein the container is a reusable shopping bag composed of a non-plastic material.

12. The method of claim 1, wherein the carbon footprint information reference includes a uniform resource locator (URL) to a network node that is configured to have access to the carbon footprint information associated with the checked out items by the POS device that utilized the container.

13. The method of claim 1, wherein the carbon footprint information reference includes a reference to a database having the carbon footprint information associated with the checked out items by the POS device that utilized the container.

14. The method of claim 1, further comprising:

obtaining transaction information associated with an item scanned by the POS device that utilized the container;

obtaining an alternative item that has a lower carbon footprint than the scanned item based on the carbon footprint information of the scanned item and the alternative item and the transaction information associated with the scanned item; and outputting an indication that includes a visual representation associated with the alternative item.

15. A point of sale (POS) device, comprising:

processing circuitry operationally coupled to a memory and a sensing device operable to sense an identifier specific to and disposed with a container configured to transport one or more items associated with checkout of those items by the POS device, the POS device being communicatively coupled over a network to a blockchain network that includes network nodes that are collectively configured to operate a blockchain having blocks, with each block having a header and a body with one or more transaction entries, with the header having a reference to a previous block on the blockchain and a reference to the transaction entries of the current block on the blockchain, the container identifier being specific to a cryptographic digital asset stored on the blockchain as a code that represents the container identifier, wherein verification of block data associated with the cryptographic digital asset is performed based on a hash value generated by applying a hashing algorithm to a block header of a previous block on the blockchain, the cryptographic digital asset also including a code that represents a reference to carbon footprint information associated with checked out items by the POS device that utilized the container, with the container identifier code and the carbon footprint information reference code being included in a transaction entry of a block on the blockchain that is associated with the cryptographic digital asset; and wherein the memory contains instructions executable by the processing circuitry whereby the processing circuitry is configured to:

sense, via the sensing device, the identifier specific to and disposed with the container during a checkout of one or more items by the POS device;

send, to a network node of the blockchain network over the network, an indication that includes a request for block data associated with the cryptographic digital asset based on the sensed container identifier sensed from the container during checkout, with the request indication including a blockchain reference to the cryptographic digital asset based on the sensed container identifier, so that the carbon footprint information associated with the checked out items by the POS device that utilized the container can be obtained based on the carbon footprint information reference code;

receive, from the network node of the blockchain network over the network, an indication that includes the block data associated with the cryptographic digital asset;

obtain the carbon footprint information reference code from the block data;

obtain the carbon footprint information reference based on the carbon footprint information reference code and a public key or a private key associated with the carbon footprint information reference code;

obtain the carbon footprint information based on the carbon footprint information reference;

and output, for display by the POS device, a visual representation that includes at least a portion of the carbon footprint information.

16. The device of claim 15, wherein the memory includes further instructions executable by the processing circuitry whereby the processing circuitry is configured to:

determine a container identifier value based on the sensed container identifier; and obtain the blockchain reference to the cryptographic digital asset based on the container identifier value.

17. The device of claim 15, wherein the memory includes further instructions executable by the processing circuitry whereby the processing circuitry is configured to:

obtain the container identifier code from the block data; and verify the container identifier code based on a public key or a private key associated with the container identifier code.

18. The device of claim 15, wherein the memory includes further instructions executable by the processing circuitry whereby the processing circuitry is configured to:

obtain transaction information associated with the one or more items checked out by the POS device that utilized the container; and send, to a network node associated with the carbon footprint information reference, the transaction information.

19. The device of claim 15, wherein the memory includes further instructions executable by the processing circuitry whereby the processing circuitry is configured to:

receive, from a network node associated with the carbon footprint information reference, an indication that includes an item that is a lower carbon footprint alternative to a corresponding item of the one or more items during the checkout, wherein the network node associated with the carbon footprint information reference is operable to determine the alternative item based on packaging information, transaction information or recycling information specific to the corresponding item and the alternative item; and output, for display, a visual representation associated with the alternative item.

20. The device of claim 15, wherein the memory includes further instructions executable by the processing circuitry whereby the processing circuitry is configured to:

receive, from a network node associated with the carbon footprint information reference, an indication that includes recycling information associated with the one or more checked out items; and output, for display, a visual representation associated with the recycling information.

21. The device of claim 15, wherein the memory includes further instructions executable by the processing circuitry whereby the processing circuitry is configured to:

receive, from a network node associated with the carbon footprint information reference, an indication that includes an incentive associated with the one or more items checked out by the POS device that utilized the container; and output, for display, a visual representation associated with the incentive.

* * * * *